(12) United States Patent
Jaquette et al.

(10) Patent No.: US 11,630,839 B2
(45) Date of Patent: Apr. 18, 2023

(54) MERGING MULTIPLE POINT-IN-TIME COPIES INTO A MERGED POINT-IN-TIME COPY

(71) Applicant: INTERNATIONAL BUSINESS MACHINES CORPORATION, Armonk, NY (US)

(72) Inventors: Glen A. Jaquette, Tucson, AZ (US); Gregory T. Kishi, Oro Valley, AZ (US); Alistair L. Symon, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 256 days.

(21) Appl. No.: 16/449,271

(22) Filed: Jun. 21, 2019

(65) Prior Publication Data
US 2019/0310995 A1    Oct. 10, 2019

Related U.S. Application Data

(63) Continuation of application No. 14/263,917, filed on Apr. 28, 2014, now Pat. No. 10,387,446.

(51) Int. Cl.
*G06F 16/27*    (2019.01)
*G06F 16/11*    (2019.01)
(52) U.S. Cl.
CPC .............. *G06F 16/27* (2019.01); *G06F 16/11* (2019.01)
(58) Field of Classification Search
CPC ...... G06F 16/11; G06F 16/27; G06F 11/1448; G06F 11/1451
See application file for complete search history.

(56) References Cited

U.S. PATENT DOCUMENTS 5,522,037 A    5/1996 Kitagawa et al.
6,594,744 B1   7/2003 Humlicek et al.
(Continued)

FOREIGN PATENT DOCUMENTS

CN    1071770 A    5/1993
CN    1740981 A    3/2006
(Continued)

OTHER PUBLICATIONS

Response dated Sep. 18, 2020, pp. 15, to Office Action dated Jun. 18, 2020, pp. 24, for U.S. Appl. No. 14/175,975.
(Continued)

*Primary Examiner* — Pierre M Vital
*Assistant Examiner* — Jedidiah P Ferrer
(74) *Attorney, Agent, or Firm* — Konrad Raynes Davda & Victor LLP; David W. Victor

(57) ABSTRACT

Provided are a computer program product, system, and method for merging multiple point-in-time copies into a merged point-in-time copy. A repository maintains a full copy of the source data and point-in-time copies at point-in-times of the source data. Each of the point-in-time copies have change information indicating changed data in the source data that changed between the point-in-time of the point-in-time copy and a subsequent point-in-time and changed point-in-time data comprising data in the source data as of the point-in-time of the point-in-time copy indicated in the change information as changed. At least two selected of the point-in-time copies in the repository are merged into a merged point-in-time copy by: forming merged change information in the merged point-in-time copy indicating changed data indicated in change information for the selected point-in-time copies; and forming merged changed data in the merged point-in-time copy from the changed data in the selected point-in-time copies.

15 Claims, 10 Drawing Sheets

(56) References Cited

U.S. PATENT DOCUMENTS

| | | |
|---|---|---|
| 6,912,629 B1 | 6/2005 | West et al. |
| 7,107,486 B2 | 9/2006 | Okada et al. |
| 7,133,884 B1 | 11/2006 | Murley et al. |
| 7,272,693 B2 | 9/2007 | Ushijima et al. |
| 7,284,104 B1 | 10/2007 | Wu et al. |
| 7,318,134 B1 | 1/2008 | Oliveira et al. |
| 7,529,782 B2 | 5/2009 | Prahlad et al. |
| 7,650,533 B1 | 1/2010 | Saxena et al. |
| 7,716,438 B2 | 5/2010 | Ushijima et al. |
| 7,809,691 B1 | 10/2010 | Karmarkar et al. |
| 7,822,717 B2 | 10/2010 | Kapoor et al. |
| 7,836,267 B1 | 11/2010 | Cross |
| 7,934,064 B1 | 4/2011 | Per et al. |
| 7,958,326 B2 | 6/2011 | Amano et al. |
| 8,060,713 B1 | 11/2011 | Natanzon |
| 8,095,804 B1 | 1/2012 | Armangau et al. |
| 8,099,572 B1 | 1/2012 | Arora et al. |
| 8,166,128 B1 | 4/2012 | Faulkner et al. |
| 8,250,033 B1 | 8/2012 | De Souter et al. |
| 8,260,752 B1 | 9/2012 | Stringham et al. |
| 8,352,422 B2 | 1/2013 | Prahlad et al. |
| 8,375,158 B2 | 2/2013 | Cho |
| 8,380,939 B2 | 2/2013 | Agesen |
| 8,386,733 B1 | 2/2013 | Tsaur et al. |
| 8,417,872 B2 | 4/2013 | Bae et al. |
| 8,453,145 B1 | 5/2013 | Naik |
| 8,473,697 B1 | 6/2013 | Tiwari et al. |
| 8,495,316 B2 | 7/2013 | Nagarkar et al. |
| 8,555,009 B1 | 10/2013 | Majahan et al. |
| 8,566,510 B2 | 10/2013 | Weingarten |
| 8,666,944 B2 | 3/2014 | Beatty et al. |
| 8,738,874 B2 | 5/2014 | Nemoto et al. |
| 8,738,883 B2 | 5/2014 | Wade et al. |
| 8,788,769 B2 | 7/2014 | Abercrombie et al. |
| 8,818,936 B1 | 8/2014 | Haase et al. |
| 8,819,362 B1 | 8/2014 | Duprey et al. |
| 8,904,125 B1 | 12/2014 | Elling et al. |
| 9,218,138 B1 | 12/2015 | Haase et al. |
| 10,176,048 B2 | 1/2019 | Jaquette et al. |
| 10,241,691 B2 | 3/2019 | Jain et al. |
| 10,372,546 B2 | 8/2019 | Jaquette et al. |
| 2003/0167380 A1 | 9/2003 | Green et al. |
| 2004/0117572 A1 | 6/2004 | Welsh et al. |
| 2004/0158766 A1 | 8/2004 | Liccione et al. |
| 2004/0186968 A1 | 9/2004 | Factor et al. |
| 2004/0260726 A1 | 12/2004 | Hrle et al. |
| 2004/0260895 A1 | 12/2004 | Werner et al. |
| 2005/0108302 A1 | 5/2005 | Rand et al. |
| 2005/0210320 A1 | 9/2005 | Vincent |
| 2005/0216788 A1 | 9/2005 | Mani-Meitav et al. |
| 2006/0041727 A1 | 2/2006 | Adkins et al. |
| 2006/0143443 A1* | 6/2006 | Cohen ................ G06F 11/1448 |
| | | 714/E11.121 |
| 2006/0173935 A1 | 8/2006 | Merchant et al. |
| 2006/0224636 A1 | 10/2006 | Kathuria et al. |
| 2007/0022319 A1 | 1/2007 | Haselton et al. |
| 2007/0055833 A1 | 3/2007 | Vu et al. |
| 2007/0245104 A1 | 10/2007 | Lindemann et al. |
| 2007/0276885 A1 | 11/2007 | Valiyaparambil et al. |
| 2007/0277010 A1 | 11/2007 | Anand et al. |
| 2007/0277012 A1 | 11/2007 | Hara et al. |
| 2007/0294495 A1 | 12/2007 | Uchida et al. |
| 2008/0077629 A1 | 3/2008 | Lorenz et al. |
| 2008/0098195 A1 | 4/2008 | Cheon et al. |
| 2008/0154914 A1 | 6/2008 | Kan et al. |
| 2008/0162590 A1 | 7/2008 | Kundu et al. |
| 2008/0243954 A1 | 10/2008 | Augenstein et al. |
| 2008/0313414 A1 | 12/2008 | Shackelford |
| 2009/0150626 A1 | 6/2009 | Benhase et al. |
| 2009/0150641 A1 | 6/2009 | Flynn et al. |
| 2009/0193064 A1 | 7/2009 | Chen et al. |
| 2009/0307286 A1 | 12/2009 | Laffin |
| 2010/0042791 A1 | 2/2010 | Helman et al. |
| 2010/0049929 A1 | 2/2010 | Nagarkar et al. |
| 2010/0057789 A1 | 3/2010 | Kawaguchi |
| 2011/0055500 A1 | 3/2011 | Sasson |
| 2011/0093436 A1 | 4/2011 | Zha et al. |
| 2011/0107025 A1 | 5/2011 | Urkude et al. |
| 2011/0173404 A1 | 7/2011 | Eastman et al. |
| 2011/0191295 A1 | 8/2011 | Ozdemir et al. |
| 2012/0078855 A1 | 3/2012 | Beatty et al. |
| 2012/0130956 A1 | 5/2012 | Caputo |
| 2012/0136832 A1 | 5/2012 | Sadhwani |
| 2012/0158662 A1 | 6/2012 | Buragohain et al. |
| 2012/0179655 A1 | 7/2012 | Beatty et al. |
| 2012/0197842 A1 | 8/2012 | Marie et al. |
| 2012/0203742 A1 | 8/2012 | Goodman et al. |
| 2012/0278539 A1 | 11/2012 | Hosogaya |
| 2012/0284232 A1 | 11/2012 | Fiske |
| 2012/0290802 A1* | 11/2012 | Wade .................... G06F 16/128 |
| | | 711/162 |
| 2013/0006944 A1 | 1/2013 | Prahlad et al. |
| 2013/0042054 A1 | 2/2013 | Jung et al. |
| 2013/0046734 A1 | 2/2013 | Cisler et al. |
| 2013/0103649 A9 | 4/2013 | Linde |
| 2013/0132346 A1 | 5/2013 | Varadarajan |
| 2013/0173552 A1 | 7/2013 | Marie et al. |
| 2013/0318318 A1 | 11/2013 | Nemoto et al. |
| 2013/0326125 A1 | 12/2013 | Chang et al. |
| 2014/0052693 A1 | 2/2014 | Zha et al. |
| 2014/0095823 A1 | 4/2014 | Shaikh et al. |
| 2014/0122434 A1 | 5/2014 | Knight et al. |
| 2014/0149695 A1* | 5/2014 | Zaslavsky ........... G06F 11/1451 |
| | | 711/162 |
| 2014/0164660 A1 | 6/2014 | DeCesaris et al. |
| 2014/0164330 A1 | 7/2014 | Barnes et al. |
| 2014/0258241 A1 | 9/2014 | Chen et al. |
| 2014/0258613 A1 | 9/2014 | Sampathkumar |
| 2014/0279920 A1* | 9/2014 | Madhavarapu ..... G06F 16/2358 |
| | | 707/649 |
| 2015/0026132 A1* | 1/2015 | Arnaudov ............. G06F 16/128 |
| | | 707/639 |
| 2015/0186217 A1* | 7/2015 | Eslami Sarab ..... G06F 11/1446 |
| | | 707/649 |
| 2015/0227432 A1 | 8/2015 | Jaquette et al. |
| 2015/0227433 A1 | 8/2015 | Jaquette et al. |
| 2015/0227438 A1 | 8/2015 | Jaquette et al. |
| 2015/0227575 A1 | 8/2015 | Jaquette et al. |
| 2015/0310080 A1 | 10/2015 | Jaquette et al. |
| 2019/0179708 A1 | 6/2019 | Jaquette et al. |

FOREIGN PATENT DOCUMENTS

| | | |
|---|---|---|
| CN | 101149694 A | 3/2008 |
| CN | 102236589 A | 11/2011 |
| CN | 103262043 A | 8/2013 |
| EP | 2234018 A1 | 9/2010 |
| JP | H0784728 A | 3/1999 |
| JP | 2005038176 A | 2/2005 |
| JP | 2005292865 A | 10/2005 |
| JP | 2007317186 A | 12/2007 |
| JP | 201126939 | 10/2008 |
| JP | 2008250667 A | 10/2008 |
| JP | 2012014286 A | 1/2012 |
| JP | 2012146301 A | 8/2012 |
| WO | 9308529 A1 | 4/1993 |
| WO | 2001001257 | 1/2001 |
| WO | 2010065271 A2 | 6/2010 |
| WO | 20130175422 | 6/2010 |

OTHER PUBLICATIONS

Preliminary Amendment dated Feb. 15, 2019, pp. 8, for U.S. Appl. No. 16/277,998.

Office Action dated Oct. 6, 2020, pp. 53, for U.S. Appl. No. 16/277,998.

Notice of Allowance dated Oct. 5, 2020, pp. 27, for U.S. Appl. No. 14/175,964.

Notice of Allowance dated Jul. 13, 2020, pp. 22, for U.S. Appl. No. 14/175,964.

Notice of Allowance6 dated May 22, 2019, pp. 32, for U.S. Appl. No. 14/175,980.

(56) References Cited

OTHER PUBLICATIONS

Office Action dated Jan. 11, 2019 pp. 24, for U.S. Appl. No. 14/175,975.
U.S. Appl. No. 14/175,980, filed Feb. 7, 2014.
Office Action dated Jul. 21, 2016, pp. 52, for U.S. Appl. No. 14/175,980, filed Feb. 7, 2014.
Response dated Oct. 21, 2016, pp. 14, for U.S. Appl. No. 14/175,980, filed Feb. 7, 2014.
Final Office Action dated Feb. 10, 2017, pp. 29, for U.S. Appl. No. 14/175,980, filed Feb. 7, 2014.
RCE/Amendment dated May 10, 2017, pp. 15, to Final Office Action dated Feb. 10, 2017, pp. 29, for U.S. Appl. No. 14/175,980, filed Feb. 7, 2014.
Notice of Allowance dated Sep. 12, 2017, pp. 21, for U.S. Appl. No. 14/175,980, filed Feb. 7, 2014.
Notice of Allowance dated Dec. 13, 2018, pp. 22, for U.S. Appl. No. 14/175,980.
U.S. Appl. No. 14/175,987, filed Feb. 7, 2014.
Office Action dated Feb. 9, 2016, pp. 49, for U.S. Appl. No. 14/175,987, filed Feb. 7, 2014.
Response dated May 9, 2016, pp. 16, to Office Action dated Feb. 9, 2016, pp. 49, for U.S. Appl. No. 14/175,987, filed Feb. 7, 2014.
Final Office Action dated Jul. 20, 2016, pp. 40, for U.S. Appl. No. 14/175,987, filed Feb. 7, 2014.
RCE Response dated Oct. 20, 2016, pp. 17, to Final Office Action dated Jul. 20, 2016, pp. 40, for U.S. Appl. No. 14/175,987, filed Feb. 7, 2014.
Notice of Allowance dated Jan. 26, 2017, pp. 21, for U.S. Appl. No. 14/175,987, filed Feb. 7, 2014.
Notice of Allowance dated Jul. 13, 2017, pp. 15, for U.S. Appl. No. 14/175,987, filed Feb. 7, 2014.
RCE/IDS filed Aug. 25, 2017 for U.S. Appl. No. 14/175,987, filed Feb. 7, 2014.
Notice of Allowance dated Nov. 7, 2017, pp. 24, for U.S. Appl. No. 14/175,987, filed Feb. 7, 2014.
Notice of Allowance dated Apr. 9, 2018, pp. 28, for U.S. Appl. No. 14/175,987, filed Feb. 7, 2014.
U.S. Appl. No. 14/263,917, filed Apr. 28, 2014.
Office Action dated May 20, 2016, pp. 52, for U.S. Appl. No. 14/263,917, filed Apr. 28, 2014.
Response dated Aug. 22, 2016, pp. 17, to Office Action dated May 20, 2016, pp. 52, for U.S. Appl. No. 14/263,917, filed Apr. 28, 2014.
Final Office Action dated Sep. 22, 2016, pp. 33, for U.S. Appl. No. 14/263,917, filed Apr. 28, 2014.
Response dated Dec. 20, 2016, pp. 15, to Office Action dated May 20, 2016, pp. 52, for U.S. Appl. No. 14/263,917, filed Apr. 28, 2014.
Advisory Action dated Jan. 23, 2017, pp. 8, for U.S. Appl. No. 14/263,917, filed Apr. 28, 2014.
Preliminary Amendment dated Jan. 24, 2017, pp. 12, for U.S. Appl. No. 14/263,917, filed Apr. 28, 2014.
Office Action dated Sep. 14, 2017, pp. 41, for U.S. Appl. No. 14/263,917, filed Apr. 28, 2014.
Response dated Dec. 14, 2017, pp. 17, to Office Action dated Sep. 14, 2017, pp. 41, for U.S. Appl. No. 14/263,917, filed Apr. 28, 2014.
Final Office Action dated Feb. 20, 2018, pp. 32, for U.S. Appl. No. 14/263,917, filed Apr. 28, 2014.
Pre-Appeal Brief Request dated May 21, 2018 for U.S. Appl. No. 14/263,917.
Office Action dated Aug. 10, 2018, pp. 15 , for U.S. Appl. No. 14/263,917.
Response dated Nov. 13, 2018, pp. 15, to Office Action dated Aug. 10, 2018, pp. 15 , for U.S. Appl. No. 14/263,917.
Notice of Allowance dated Jan. 30, 2019, pp. 42, for U.S. Appl. No. 14/263,917.
Notice of Allowance dated Apr. 8, 2019, pp. 27, for U.S. Appl. No. 14/263,917.
Notice of Allowance dated Sep. 7, 2018, pp. 21, for U.S. Appl. No. 14/175,987.
Notice of Allowance dated Mar. 15, 2019, pp. 24, for U.S. Appl. No. 14/175,980.
Response dated Apr. 11, 2019, pp. 14, Office Action dated Jan. 11, 2019 pp. 24, for U.S. Appl. No. 14/175,975.
Office Action dated Jan. 10, 2019, pp. 15, for U.S. Appl. No. 14/175,964.
Response dated Apr. 10, 2019, pp. 16, to Office Action dated Jan. 10, 2019, pp. 15, for U.S. Appl. No. 14/175,964.
U.S. Appl. No. 16/277,998, filed Feb. 15, 2019.
List of IBM Patents and Applications Treated as Related, dated Jun. 21, 2019, pp. 2.
Final Office Action dated Aug. 28, 2019, pp. 52, for U.S. Appl. No. 14/175,975.
Final Office Action dated Aug. 28, 2019, pp. 44, for U.S. Appl. No. 14/175,964.
Chesarek, et al., "IBM System Storage FlashCopy Manager and PPRC Manager Overview", IBM Corporation, Document No. REDP-4065, pp. 62, 2008.
Burger, et al., "IBM System Storage DS8000 Series: IBM FlashCopy SE", IBM Corporation, Document No. REDP-4368-00, pp. 80, Feb. 2008.
Cronauer, et al., "IBM System Storage DS8000 Copy Services for Open Systems", IBM Corporation, Document No. SG24-6788-06, pp. 800, Feb. 2013.
PCT International Search Report and Written Opinion dated Jun. 15, 2015, for Application No. PCT/IB2015/050225, filed Jan. 12, 2015.
U.S. Pat. No. 8,666,944 is the English language counterpart of Chinese Patent No. 103262043.
English language translation of CN 1740981 filed Mar. 1, 2006.
English language translation of CN 102236589 filed Apr. 17, 2013.
English language translation of CN 103262043 filed Aug. 21, 2013.
PCT International Search Report and Written Opinion dated Sep. 6, 2015, for Application No. PCT/IB2015/052543, filed Apr. 8, 2015.
UK Examination Report dated Dec. 16, 2016, pp. 3, for Application No. 1619298.1, filed Apr. 8, 2015.
UK Reply to Examination Report dated Feb. 1, 2017, pp. 13, to UK Examination Report dated Dec. 16, 2016, pp. 3, for Application No. 1619298.1, filed Apr. 8, 2015.
CN Office Action dated Jul. 3, 2018, pp. 7 , for Application No. 201580007367.
English Machine translation of CN Office Action dated Jul. 3, 2018, pp. 7 , for Application No. 201580007367.
English Machine translation of CN1071770A, pp. 11.
English Machine translation of CN 101149694, pp. 8.
WO9308529A1 is the English counterpart of CN101149694A, pp. 34.
Robocopy.exe, Microsoft, Corpporation, Copyright 1985-2003, pp. 35.
English Machine translation of JP2005292865, dated Sep. 21, 2018, pp. 16.
English Machine translation of JP2007317186, dated Sep. 21, 2018, pp. 33.
English Machine translation of JP2008250667, dated Sep. 21, 2018, pp. 40.
English Machine translation of JP2012146301 dated Sep. 21, 2018, pp. 18.
JP Office Action dated Sep. 18, 2018, pp. 6, for Serial No. 2016-548352.
JP Office Action dated Jan. 8, 2019, pp. 4, for Serial No. 2016-562001.
English machine translation of JP Office Action dated Jan. 8, 2019, pp. 4, for Serial No. 2016-562001.
English machine translation of JP2005038176A dated Feb. 10, 2005, pp. 13.
English machine translation of JP201126939 dated Feb. 4, 2010, pp. 23.
U.S. Pat. No. 8,738,874 dated May 27, 2014 is the English language equivalent of JP201126939 dated Feb. 4, 2010.
Final Office Action dated Feb. 5, 2019, pp. 3, Application No. JP2016-548352 filed Jan. 12, 2015.
English machine translation dated Feb. 11, 2019, pp. 4, of Final Office Action dated Feb. 5, 2019, pp. 3, Application No. JP2016-548352.
English machine translation dated Feb. 11, 2019, pp. 25 of JP2012014286 dated Jan. 19, 2012.

(56) References Cited

OTHER PUBLICATIONS

U.S. Appl. No. 14/175,964, filed Feb. 7, 2014.
Office Action dated Dec. 30, 2015, pp. 36, for U.S. Appl. No. 14/175,964, filed Feb. 7, 2014.
Response dated Mar. 30, 2016, pp. 15, to Office Action dated Dec. 30, 2015, pp. 36, for U.S. Appl. No. 14/175,964, filed Feb. 7, 2014.
Final Office Action dated Jul. 15, 2016, pp. 40, for U.S. Appl. No. 14/175,964, filed Feb. 7, 2014.
Response dated Oct. 17, 2016, pp. 14, to Final Office Action dated Jul. 15, 2016, pp. 40, for U.S. Appl. No. 14/175,964, filed Feb. 7, 2014.
RCE/Amend/IDS dated Nov. 15, 2016, pp. 14, to Final Office Action dated Jul. 15, 2016, pp. 40, for U.S. Appl. No. 14/175,964, filed Feb. 7, 2014.
Office Action dated Sep. 14, 2017, pp. 48, for U.S. Appl. No. 14/175,964, filed Feb. 7, 2014.
Response dated Dec. 14, 2017, pp. 15, to Office Action dated Sep. 14, 2017, pp. 48, for U.S. Appl. No. 14/175,964, filed Feb. 7, 2014.
Final Office Action 2 dated Apr. 30, 2018, pp. 33, for U.S. Appl. No. 14/175,964, filed Feb. 7, 2014.
Pre-Appeal Brief Request dated Jul. 30, 2018, pp. 6, for U.S. Appl. No. 14/175,964.
U.S. Appl. No. 14/175,975, filed Feb. 7, 2014.
Office Action dated Mar. 9, 2016, pp. 49, for U.S. Appl. No. 14/175,975, filed Feb. 7, 2014.
Response dated Jun. 9, 2016, pp. 14, to Office Action dated Mar. 9, 2016, pp. 49, for U.S. Appl. No. 14/175,975, filed Feb. 7, 2014.
Final Office Action dated Sep. 23, 2016, pp. 35, for U.S. Appl. No. 14/175,975, filed Feb. 7, 2014.
RCE/Response dated Jan. 23, 2017, pp. 14, to Final Office Action dated Sep. 23, 2016, pp. 35, for U.S. Appl. No. 14/175,975, filed Feb. 7, 2014.
Office Action dated Aug. 11, 2017, pp. 38, for U.S. Appl. No. 14/175,975, filed Feb. 7, 2014.
Response dated Nov. 13, 2017, pp. 16, to Office Action dated Aug. 11, 2017, pp. 38, for U.S. Appl. No. 14/175,975, filed Feb. 7, 2014.
Final Office Action dated Feb. 23, 2018, pp. 37, for U.S. Appl. No. 14/175,975, filed Feb. 7, 2014.
Pre-Appeal Brief Request dated Jun. 25, 2018, pp. 6, for U.S. Appl. No. 14/175,975.
Notice of Allowance dated Dec. 17, 2020, pp. 32, for U.S. Appl. No. 14/175,964.
Final Office action dated Dec. 18, 2020, pp. 43, for U.S. Appl. No. 14/175,975.
Notice of Allowance dated Jun. 24, 2021, pp. 23, for U.S. Appl. No. 14/175,975.
Response dated Mar. 18, 2021 pp. 14, to Final Office Action dated Dec. 18, 2020, pp. 43, for U.S. Appl. No. 14/175,975.
Response dated Jan. 14, 2021, pp. 20, to Office Action dated Oct. 6, 2020, pp. 53, for U.S. Appl. No. 16/277,998.
Notice of Allowance dated Mar. 26, 2021, pp. 20, for U.S. Appl. No. 16/277,998.
Pre-Appeal Brief dated May 9, 2021, pp. 5, for U.S. Appl. No. 14/175,975.
Pre Appeal Brief dated Dec. 29, 2019, pp. 6, for U.S. Appl. No. 14/175,964.
Appeal Brief dated Mar. 6, 2020, pp. 26, for U.S. Appl. No. 14/175,964.
JP Office Action dated Dec. 19, 2018, pp. 4, for Serial No. 2016-562001.
English translation of JP Office Action dated Dec. 19, 2018, pp. 3, for Serial No. 2016-562001.

\* cited by examiner

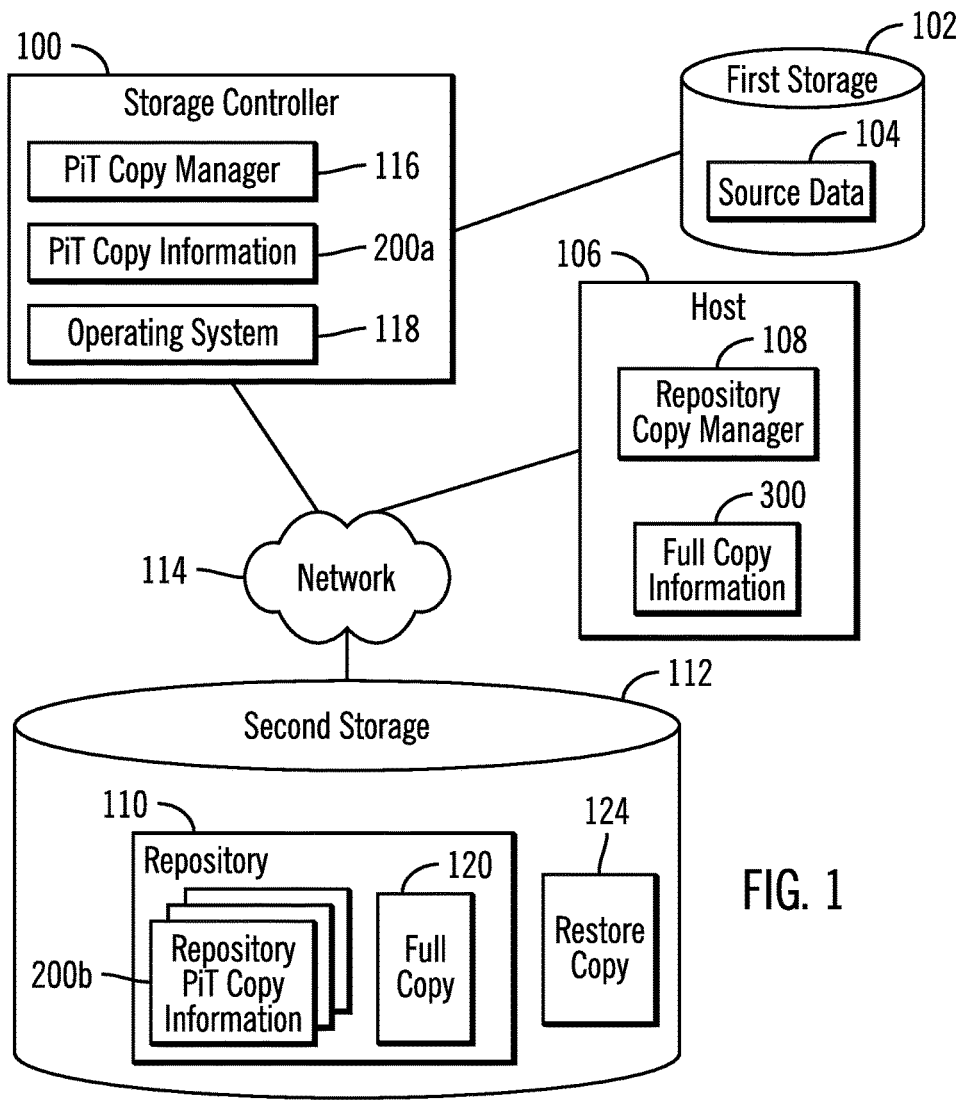
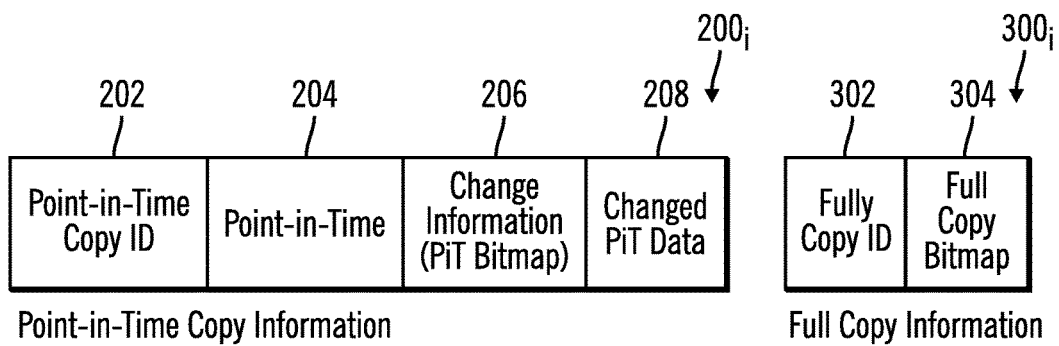
FIG. 2 — Point-in-Time Copy Information
FIG. 3 — Full Copy Information

MERGING MULTIPLE POINT-IN-TIME COPIES INTO A MERGED POINT-IN-TIME COPY

BACKGROUND OF THE INVENTION

1. Field of the Invention

The present invention relates to a computer program product, system, and method for merging multiple point-in-time copies into a merged point-in-time copy.

2. Description of the Related Art

In a storage environment, a storage controller may create point-in-time ("PiT") copies of a production volume using point-in-time copy techniques, such as the IBM Flash-Copy® (FlashCopy is a registered trademark of IBM), snapshot, etc. A point-in-time copy replicates data in a manner that appears instantaneous and allows a host to continue accessing the source volume while actual data transfers to the copy volume are deferred to a later time. The point-in-time copy appears instantaneous because complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the target volume.

When an update to a block in the source volume involved in a point-in-time copy relationship is received, the copy of the track as of the point-in-time must be copied to side file or the target volume before the new data for the track is written to the source volume, overwriting the point-in-time copy of the data.

SUMMARY

Provided are a computer program product, system, and method for merging multiple point-in-time copies into a merged point-in-time copy. A repository maintains a full copy of the source data and point-in-time copies at point-in-times of the source data. Each of the point-in-time copies have change information indicating changed data in the source data that changed between the point-in-time of the point-in-time copy and a subsequent point-in-time and changed point-in-time data comprising data in the source data as of the point-in-time of the point-in-time copy indicated in the change information as changed. At least two selected of the point-in-time copies in the repository are merged into a merged point-in-time copy by: forming merged change information in the merged point-in-time copy indicating changed data indicated in change information for the selected point-in-time copies; and forming merged changed data in the merged point-in-time copy from the changed data in the selected point-in-time copies.

BRIEF DESCRIPTION OF THE DRAWINGS

FIG. 1 illustrates an embodiment of a storage environment.

FIG. 2 illustrates an embodiment of point-in-time copy information.

FIG. 3 illustrates an embodiment of full copy information.

DETAILED DESCRIPTION

Figure 4:
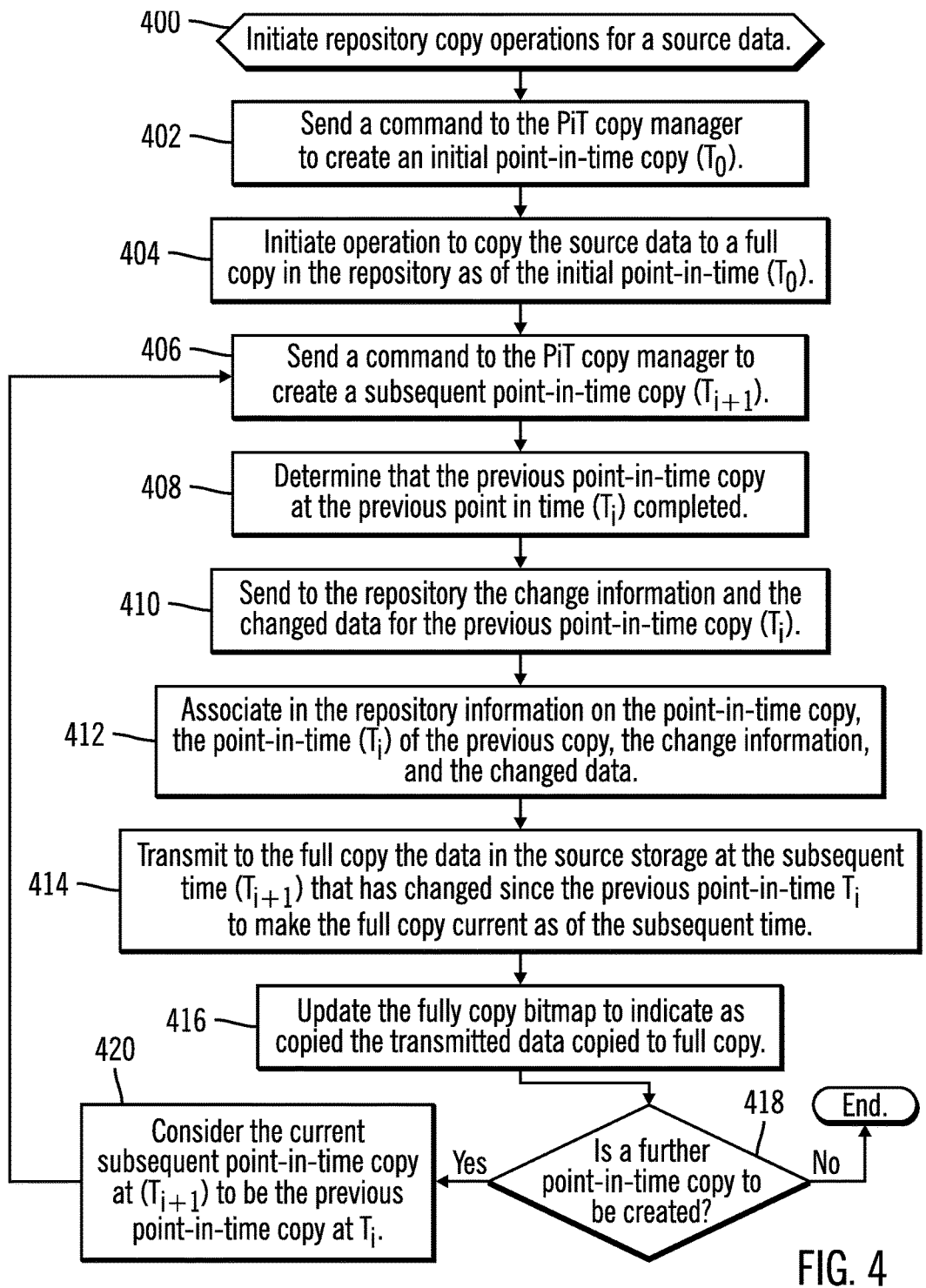
FIGS. 4 and 8 illustrate embodiments of operations to create a repository having the source data and point-in-time information of the source data at different point-in-times.

Described embodiments provide techniques for creating a repository to maintain a full copy of the source data and point-in-time copies of the source data to allow the source data to be restored from the repository at different point-in-times. With described embodiments, multiple selected of the point-in-time copies in the repository may be merged to consolidate the number of stored point-in-time copies. Further, with described embodiments, the operations to maintain the point-in-time copy information in the repository, perform the restore operations, and perform point-in-time copy merge operations may be performed by a program component separate from the storage controller logic creating the point-in-time copies from the source data, so that the repository is separately maintained, used, and managed from the storage controller.

FIG. 1 illustrates an embodiment of a data storage environment having a storage controller 100 managing access to a first storage 102 that includes source data 104, such as a production volume used by different host systems. A host 106 includes a repository copy manager program 108 to manage the copying of the source data 104 to a repository 110 in a second storage 112. The storage controller 100, host 106, and second storage 112 may communicate over a network 114.

The storage controller 100 includes a point-in-time ("PiT") copy manager 116 to create point-in-time copies of the source data 104, e.g., FlashCopy, snapshot, etc. When creating a PiT copy, the PiT copy manager 116 generates PiT copy information 200*a* on the PiT copy created as of a point-in-time. The storage controller 100 further includes an operating system 118, including the code and logic to manage Input/Output ("I/O") requests to the source data 104. The operating system 118 may configure the source data 104 in one or more volumes and data is stored in data units, such as tracks, logical block addresses (LBAs), extents, etc. The PiT copy manager 116 may be a copy service supplied with the operating system 118.

The storages 102 and 112 may store tracks in a Redundant Array of Independent Disks (RAID) configuration where strides of tracks are written across multiple storage devices comprising the storages 102 and 112. The storages 102 and 112 may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

The network 114 may comprise a network such as one or more interconnected Local Area Networks (LAN), Storage Area Networks (SAN), Wide Area Network (WAN), peer-to-peer network, wireless network, etc.

The PiT copy manager 116 performs a PiT copy operation that replicates data in a manner that appears instantaneous and allows a process to continue accessing the source volume while actual data transfers to the copy volume are deferred to a later time. The point-in-time copy appears instantaneous because complete is returned to the copy operation in response to generating the relationship data structures without copying the data.

The repository copy manager 108 may create a full copy 120 of the source data 104 in the repository 110 and copies the PiT copy information 200a at the storage controller 100 to the repository 110 to store as repository PiT copy information 200b in the repository 110. The repository copy manager 108 maintains full copy information 300 that is used to manage the creation of the full copy 120. In this way, the repository copy manager 108 maintains a separate full copy of the source data 104 and the PiT copy information 200b of the source data 104 in a separate storage 112 so that data can be restored to different point-in-times independently of the source data 104 in the first storage 102 and the PiT copy information 200a at the storage controller 100. Thus, the repository 110 by allowing for independent restore of the source data 104 provides a redundant secure backup independent of the storage controller 100 to protect from failure at the storage controller 100 or first storage 102.

In certain embodiments, the creation and management of the repository 110 is managed by a repository copy manager 108 that is separate from the storage controller 100 programs, such as the PiT copy manager 116 that creates the PiT copies. The repository copy manager 108 may use the repository PiT copy information 200b and the full copy 120 to create a restore copy 124 at different point-in-times. The full copy 120, which includes the data as of a most current point-in-time, may be overwritten with data from the repository PiT copy information 200b during a restore to roll the database back to a restore point-in-time that may be prior to a current point-in-time of the full copy 120.

In an alternative embodiment, the repository copy manager 108, full copy information 300, and/or the repository 110 may be maintained on the storage controller 100.

FIG. 2 illustrates an instance of the PiT copy information $200_i$ which may comprise information maintained for the storage controller PiT copy information 200a and the repository PiT copy information 200b. The PiT copy information $200_i$ for the storage controller 200a and repository 200b may be stored in different formats reflecting the different use of that information because the repository PiT copy information 200b is intended for use by the repository copy manager 108 to manage the source data in the repository. A PiT copy information instance $200_i$ may include a PiT copy identifier 202 identifying the PiT copy created by the PiT copy manager 116 at the storage controller 100; a point-in-time 204 of the PiT copy 202, which may mean that data is consistent as of that point-in-time 204; change information 206 indicating which data or tracks in the source data 104 has changed since the point-in-time 204 and while the PiT copy 202 was open, which may comprise a bitmap having a bit for each data unit (e.g., track) that is set to one of two values indicating the data or track represented by the bit has or has not been updated since the point-in-time 204; and the changed PiT data 208 comprising the data at the point-in-time 204 that was changed after the point-in-time 204 while the PiT copy 202 was open and still being updated.

In one embodiment, the PiT copy may be completed or frozen at a time subsequent to the point-in-time 204, such that the changed PiT data 208 includes data changed from the point-in-time 204 until the PiT copy 202 was completed, e.g., frozen or a new PiT copy initiated, and does not include changed data after the PiT copy 202 was completed, e.g., frozen. A PiT copy 202 may be completed upon a freeze command or initiating a subsequent PiT copy at a subsequent point-in-time to the point-in-time 204. A completed PiT copy 202 may be consistent as of the point-in-time. Other techniques may be used to complete, e.g., freeze, the PiT copy.

In one embodiment, the full copy 120 may be a separate copy of the source data as shown in FIG. 1. In an alternative embodiment, the data in the full copy 120 may be included in the changed PiT data 208.

FIG. 3 illustrates an embodiment of full copy information $300_i$ maintained by the repository copy manager 108, comprising an instance of the full copy information 300 for one full copy 120 being created in the repository 110. The full copy information instance $300_i$ may include a full copy identifier 302 of the particular full copy 120 and a full copy bitmap 304 having a bit for each track or data unit in the source data 104 to copy to the full copy 120, where each bit indicates whether the corresponding data unit has or has not been copied. The background copy operation of the source data 104 to the full copy 120 is completed after all the bits in the full copy bitmap 304 are set to indicate the source data was copied.

FIG. 4 illustrates an embodiment of operations performed by the repository copy manager 108 and the PiT copy manager 116 to create a repository 110 copy at different points-in-time from the PiT copies for source data 104, such as a production volume, created by the PiT copy manager 116. Upon initiating (at block 400) repository copy operations for source data 104, the repository copy manager 108 sends (at block 402) a command to the PiT copy manager 116 to create an initial point-in-time copy $200_0$ at an initial point-in-time, referred to herein as $T_0$. The repository copy manager 108 initiates (at block 404) an operation to copy the source data 104 to a full copy 120 in the repository 110 as of the initial point-in-time ($T_0$). A part of the operation to create the full copy 120, the repository copy manager 108 may initialize full copy information instance $300_i$ for the full copy 120 being created, and may initialize all the bits in the full copy bitmap 304 to indicate the corresponding data units in the source data 104 have not been copied. The source data 104 may be copied in the background to the full copy 120 and the full copy bitmap 304 updated for data units from the source data 104 copied to the full copy 102.

The repository copy manager 108 may send (at block 406) a command to the PiT copy manager 116 to create a subsequent PiT copy ($T_{i+1}$) at a subsequent point-in-time $T_{i+1}$, which would result in PiT copy information $200_{i+1}$. In one embodiment, the repository copy manager 108 may send individual commands to the PiT copy manager 116 to create PiT copies and freeze a previously created PiT copy. In an alternative embodiment, the repository copy manager 108 may send one command to the PiT copy manager 116 to instruct it to periodically create PiT copies of the source data 104, where the creation of a subsequent PiT copy freezes the previously created PiT copy. Still further, the PiT copy manager 116 at the storage controller 100 may be independently creating PiT copies without prompting from the repository copy manager 108.

Upon determining (at block 408) that the previous point-in-time copy at $T_i$ completed, the repository copy manager 116 sends (at block 410) to the repository 110 for storage the PiT copy information $200_i$ for the PiT copy at time $T_i$, including the change information 206 and the changed PiT data 208 to store in the repository PiT copy information for $T_i$. In one embodiment, a PiT copy at point-in-time $T_i$ may be completed upon the creation of the subsequent PiT copy at time $T_{i+1}$. In an alternative embodiment, a PiT copy may be completed by issuing a freeze command to freeze the PiT copy so that the change information 206 stops indicating changes to the source data 104. The repository 110 creates (at bock 412) in the repository PiT copy information 200b an association of the point-in-time 204 of the previous PiT copy, the change information 206 and the changed PiT data 208 for the previous PiT copy.

The repository copy manager 108 may transmit (at block 414) to the full copy 120 the data in the source data 104 at the subsequent time ($T_{i+1}$) to make the full copy current as of the subsequent time $T_{i+1}$. To perform this operation, the repository copy manager 108 may determine from the change information 206 for the previous PiT copy at $T_i$ the data units in the source data 104 that have changed and then copy those data units from the source data 104 to the full copy 120. In this way, at the subsequent point-in-time $T_{i+1}$ when the subsequent PiT copy ($T_{i+1}$) is created, data units in the source data 104 that have changed between the previous point-in-time $T_i$ and the subsequent point-in-time $T_{i+1}$ are copied to the full copy 120 in the repository 110. The full copy bitmap 304 is updated (at block 416) to indicate any data units from the source data 104 copied to the full copy 120 after the data units are transmitted at block 414. In this way, the full copy 120 is always moving forward in time, having data current as of the most recent or subsequent PiT copy. At some point, the full copy 120 may be completed while PiT copies are still being created. In such case, the full copy 120 will continue to be updated with changed data units determined at subsequent point-in-times for subsequent PiTs.

If (at block 418) further point-in-time copies are to be created, then the repository copy manager 108 considers (at block 420) the current subsequent point-in-time copy at ($T_{i+1}$) to be the previous point-in-time copy at $T_i$ during the next iteration of processing the next PiT copy. In this way, i is effectively incremented as the current subsequent point-in-time $T_{i+1}$ becomes the previous point-in-time and a next point-in-time becomes the new subsequent point-in-time. Control then proceeds back to block 406 to create or process a new subsequent PiT copy ($T_{i+1}$) at a new subsequent point-in-time $T_{i+1}$. If (at block 418) there are no further PiT copies to process, then control ends.

With the described embodiments of FIG. 4, a repository 110 of a full copy of the source data 104 having PiT copy information for different PiT copies is created independently of the storage controller operations to create the PiT copies. In this way, the logic or operations of the repository management operations are independent of the storage controller 100 logic to create PiT copies.

Figure 5:
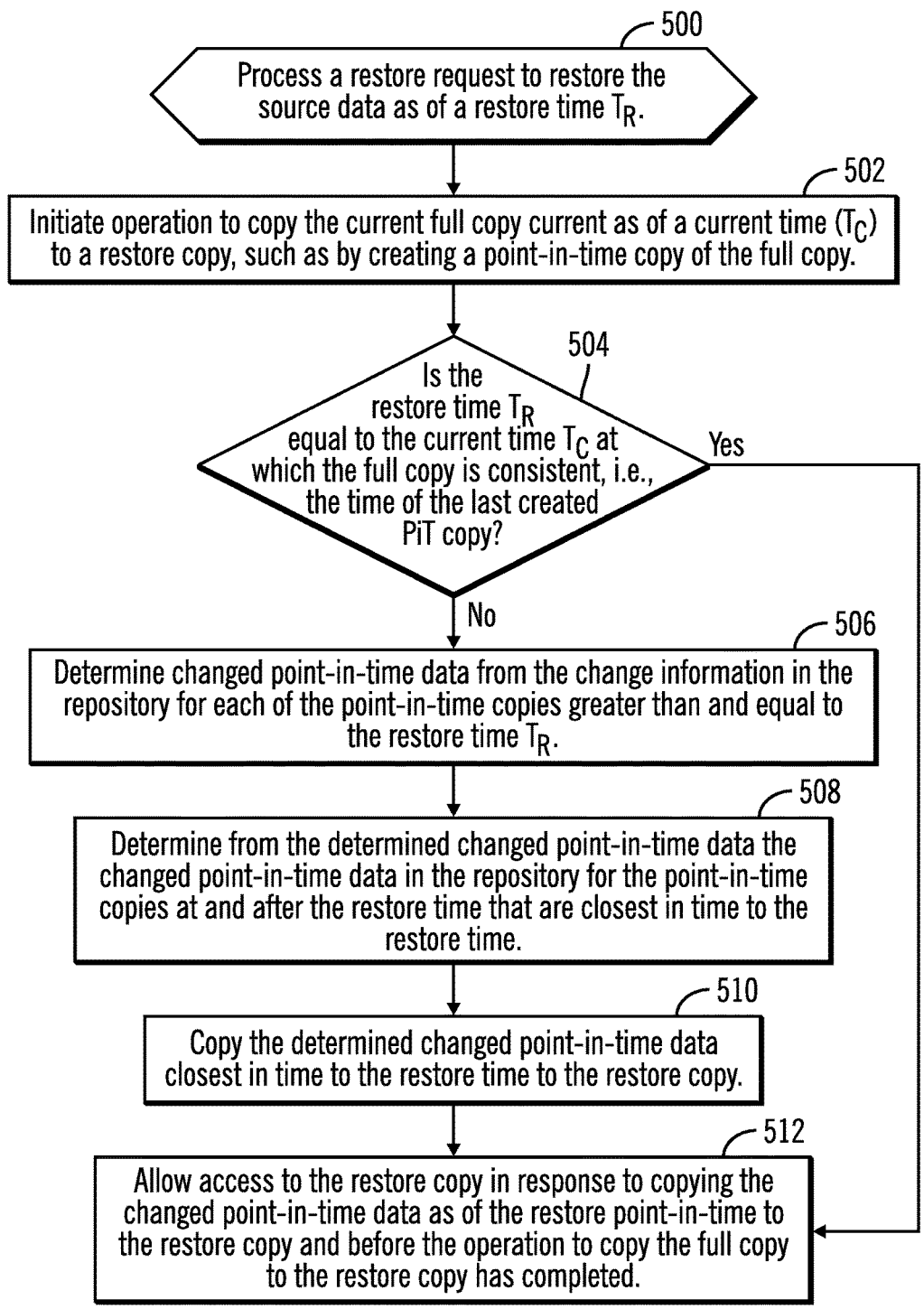
FIGS. 5 and 9 illustrate embodiments of operations to restore a point-in-time copy of the source data from the repository.

FIG. 5 illustrates an embodiment of operations performed by the repository copy manager 108 to restore the source data from the repository 110 to a restore copy 124 at a restore time $T_R$, where $T_R$ may comprise one of the point-in-times 204 of any repository PiT copy 200b. Upon processing (at block 500) a restore request to restore the source data 104 as of a restore time $T_R$, the repository copy manager 108 initiates (at block 502) an operation to copy the current full copy 120 current as of a current time ($T_C$) to a separate restore copy 124. In one embodiment, the repository copy manager 108 may invoke the PiT copy manager 116 to create a PiT copy of the full copy 120 and then perform a background copy operation of the full copy 120 to the restore copy 124. If (at block 504) the restore time $T_R$ is equal to the current time $T_C$ of the full copy 120 being copied to the restore copy 124, then the restore copy 124 is complete and access may be allowed (at block 512) to the restore copy 124. In one embodiment, the restore copy 124 may be created as a PiT copy of the full copy 120 with a background copy operation to copy the full copy 120 data to the restore copy 124.

If (at block 504) the restore time $T_R$ is at a point-in-time earlier than the current time $T_C$ of the full copy 120, then control proceeds to block 506 to roll back the restore copy 124 created from the full copy 120 to the earlier restore time $T_R$. At block 506, the repository copy manager 108 determines changed PiT data 208 from the change information 206 for each of the PiT copies $200_i$ having a point-in-time greater than and equal to the restore time $T_R$. A determination is then made (at block 508) from the determined changed point-in-time data the changed point-in-time data that is closest in time to the restore time $T_R$ in the repository 110 for PiT copies 200b greater than or equal to the restore point-in-time $T_R$. The determined of the changed PiT data closest in time to the restore time $T_R$ is copied (at block 510) to the restore copy 124 to roll the restore copy 124 back to the time of the restore time $T_R$. The repository copy manager 108 allows (at block 512) access to the restore copy 124 in response to copying the changed point-in-time data as of the restore time ($T_R$) to the restore copy 124 and before the background operation to copy the full copy to the restore copy has completed. If the user attempts to access data in the restore copy 124 not yet copied from the full copy 120, then the requested data may be retrieved from the full copy 120 to copy to the restore copy 124 and returned to the user.

In one embodiment, the repository copy manager 108 may consolidate the changed data in the PiT copies greater than or equal to the restore time $T_R$ so that if there are multiple instances of changed data for one data unit at different point-in-times greater than or equal to the restore time $T_R$ then only the changed data for the data unit from the PiT copies closest in time to the restore time is copied to the restore copy 124. In an alternative embodiment, the repository copy manager 108 may perform a brute force copy method by starting from the most recent PiT copy following the restore time $T_R$ and copying the changed data, and then copying the changed data for each subsequently PiT copy closer in time to the restore time until the changed data for the PiT copy having a point-in-time at the restore time $T_R$ is copied to the restore copy 124. Other techniques may be used to roll back the restore copy 120 to the restore time prior to the current time.

With the described embodiments, the logic to restore the source data 104 is independent of the storage controller 100 and performed from a repository 110 maintained in a storage system 112 separate from the storage system 102 having the source data 104. Further, with described embodiments, restore copies may be created and available for use and modification by users without affecting or changing the source data maintained in the repository 110, which may be used to restore the source data 104 to different point-in-times independent of the storage controller 100 PiT copy manager 116.

Figure 6A:
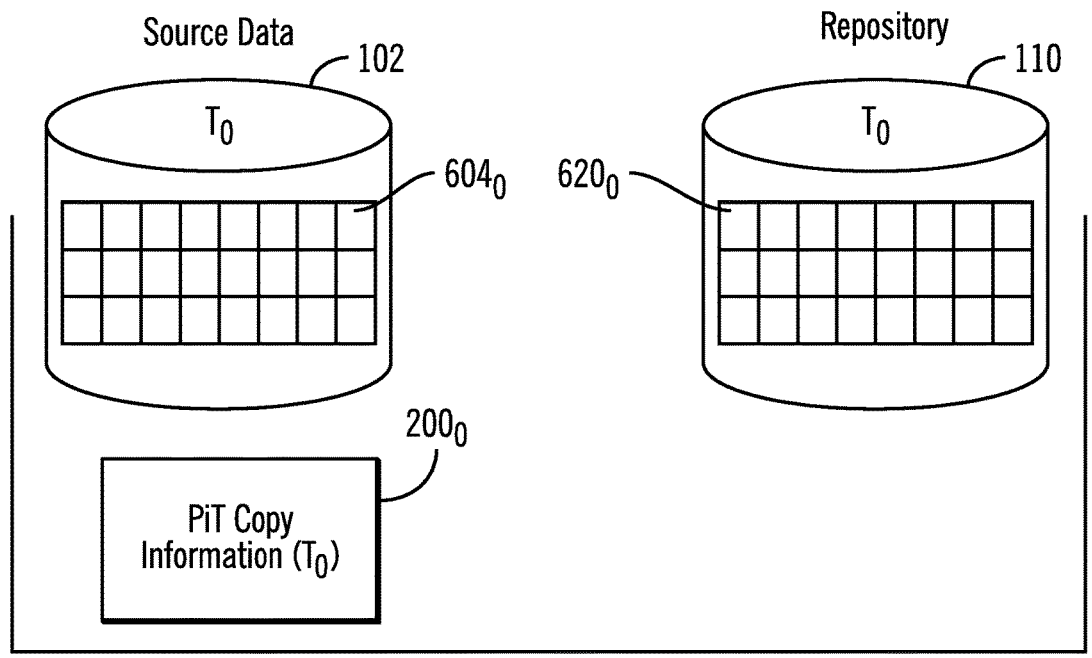
FIGS. 6*a*, 6*b*, and 6*c* illustrate examples of states of the source data and the repository at different point-in-times.
Figure 6B:
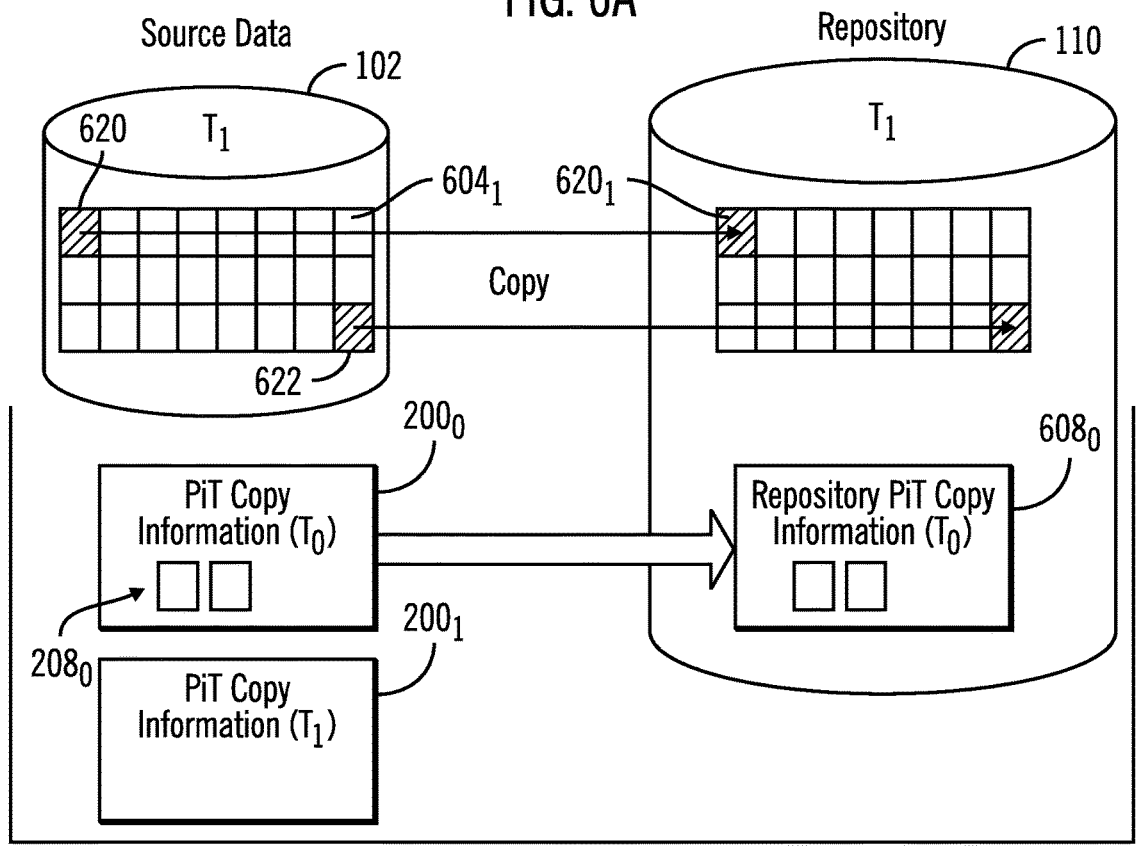
Figure 6C:
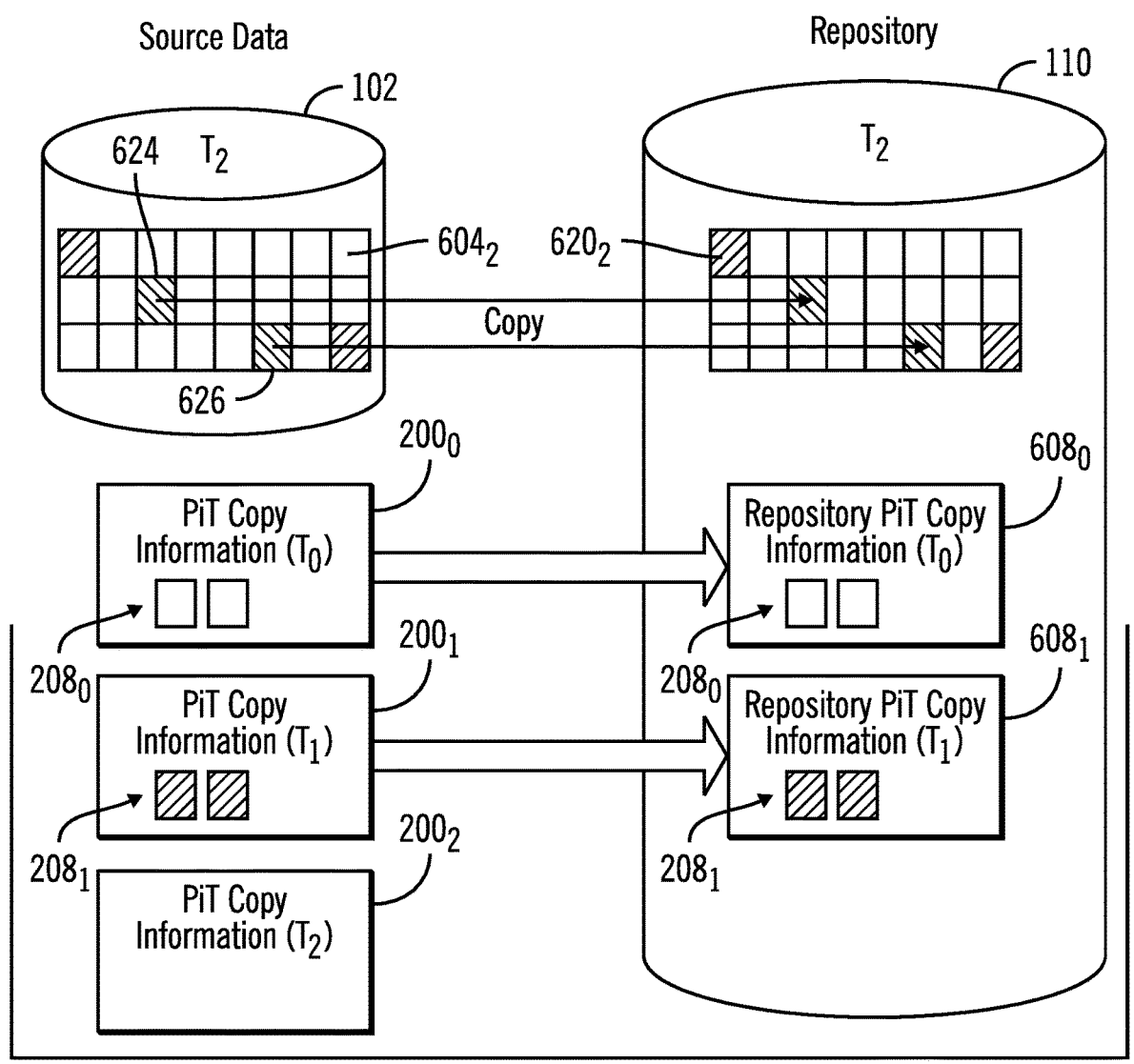

FIGS. 6a, 6b, 6c illustrate an example of the operations of FIG. 4 to create the full copy 120 and repository PiT copy information 200b. FIG. 6a shows the state at an initial time $T_0$ of the source data $604_0$ in the source storage 102 that is copied to a full copy 620 in the repository 110. Further, a PiT copy $200_0$ is created at the initial time $T_0$ to capture the source data at the initial time $T_0$ that is changed following the initial time and store as changed data 208 at the storage controller 100.

FIG. 6b shows a time $T_1$ when a second PiT copy at $T_1$ $200_1$ is created, which may result in the completion or freezing of the PiT copy at $T_0$ having changed data $208_0$ as of the point-in-time $T_0$ before changes occurring between $T_0$ and $T_1$. The repository copy manager 108 copies the changed data between $T_0$ and $T_1$, shown as units 620 and 622, to the repository 110 to update the full copy $620_1$ to have data as of $T_1$. Further, the completed, or frozen, PiT copy information $200_0$ at $T_0$ having the changed data $208_0$ as of $T_0$, before being updated, is copied to the repository 110 to store as repository PiT copy $608_0$.

FIG. 6c shows a time $T_2$ when a third PiT copy at $T_2$ $200_2$ is created, which may result in the completion or freezing of the PiT copy $200_1$ at $T_1$ having changed data $208_1$ as of the point-in-time $T_1$ before changes occurring between $T_1$ and $T_2$. The repository copy manager 108 copies the changed data between $T_1$ and $T_2$, shown as 624 and 626, to the repository 110 to update the full copy $620_2$ to have data as of $T_2$. Further, the completed, or frozen, PiT copy information $200_1$ at $T_1$ having the changed data $208_1$, as of $T_1$ before being updated, is copied to the repository 110 to store as repository PiT copy $608_1$.

Figure 7A:
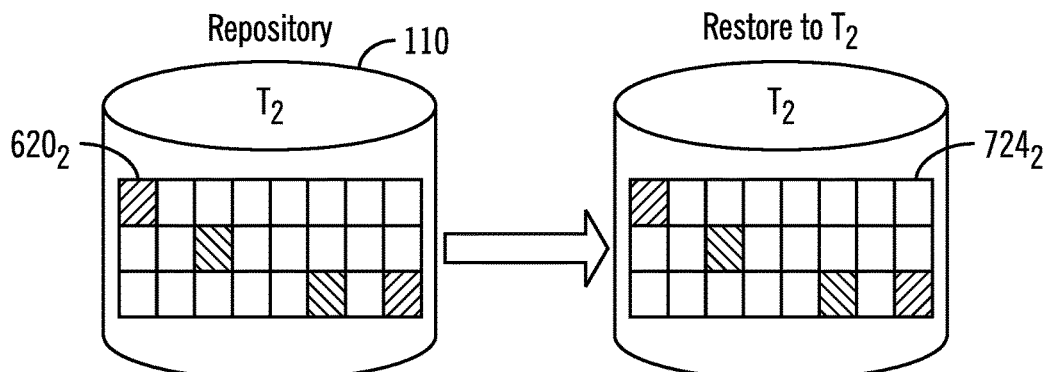
FIGS. 7*a*, 7*b*, and 7*c* illustrate the restoration of the source data to different point-in-times.
Figure 7B:
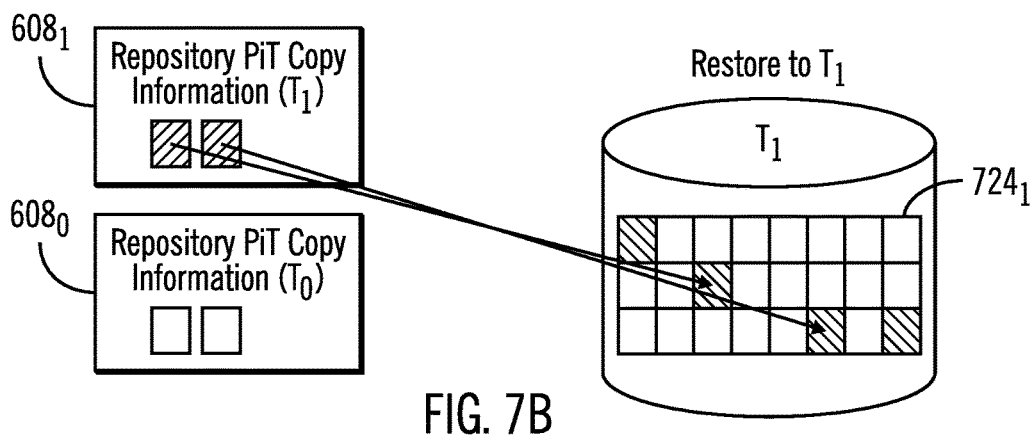
Figure 7C:
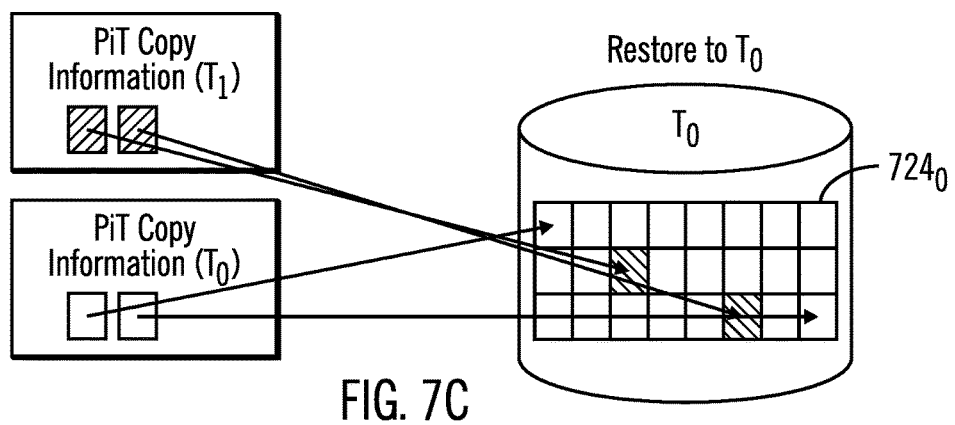

FIGS. 7a, 7b, and 7c illustrate an example of operations to generate a restore copy 124 at different restore times $T_2$, $T_1$, and $T_0$, respectively, according to the operations of FIG. 5. FIG. 7a shows the repository as of time $T_2$ being used to create a restore copy $724_2$ at $T_2$. As shown in FIG. 7a, since the restore time $T_2$ is equal to the current time of data at the full copy $720_2$, once the restore copy $724_2$ is created by copying, either directly or using a point-in-time copy with a background copy, the restore is complete because no rolling back data to a previous restore time is needed because the restore time and the current time are the same, $T_2$.

FIG. 7b illustrates an example of operations to generate a restore copy $724_1$ as of a restore time of $T_1$, which is prior in time to the current time $T_2$ of the repository full copy $620_2$. To return the restore copy to $T_1$, the repository copy manager 108 copies the changed data from the repository PiT copy $608_1$ for the point-in-time of $T_1$, which has data as of $T_1$ that has changed between $T_1$ and $T_2$.

FIG. 7c illustrates an example of operations to generate a restore copy $724_0$ as of a restore time of $T_0$, which is prior in time to the current time $T_2$ of the repository full copy $620_2$. To return the restore copy to $T_0$, the repository copy manager 108 copies the changed data from the repository PiT copies $608_0$ and $608_1$ for the point-in-times of $T_0$ and $T_1$, respectively, which has data as of $T_0$ that has changed between $T_0$ and $T_2$.

Figure 8:
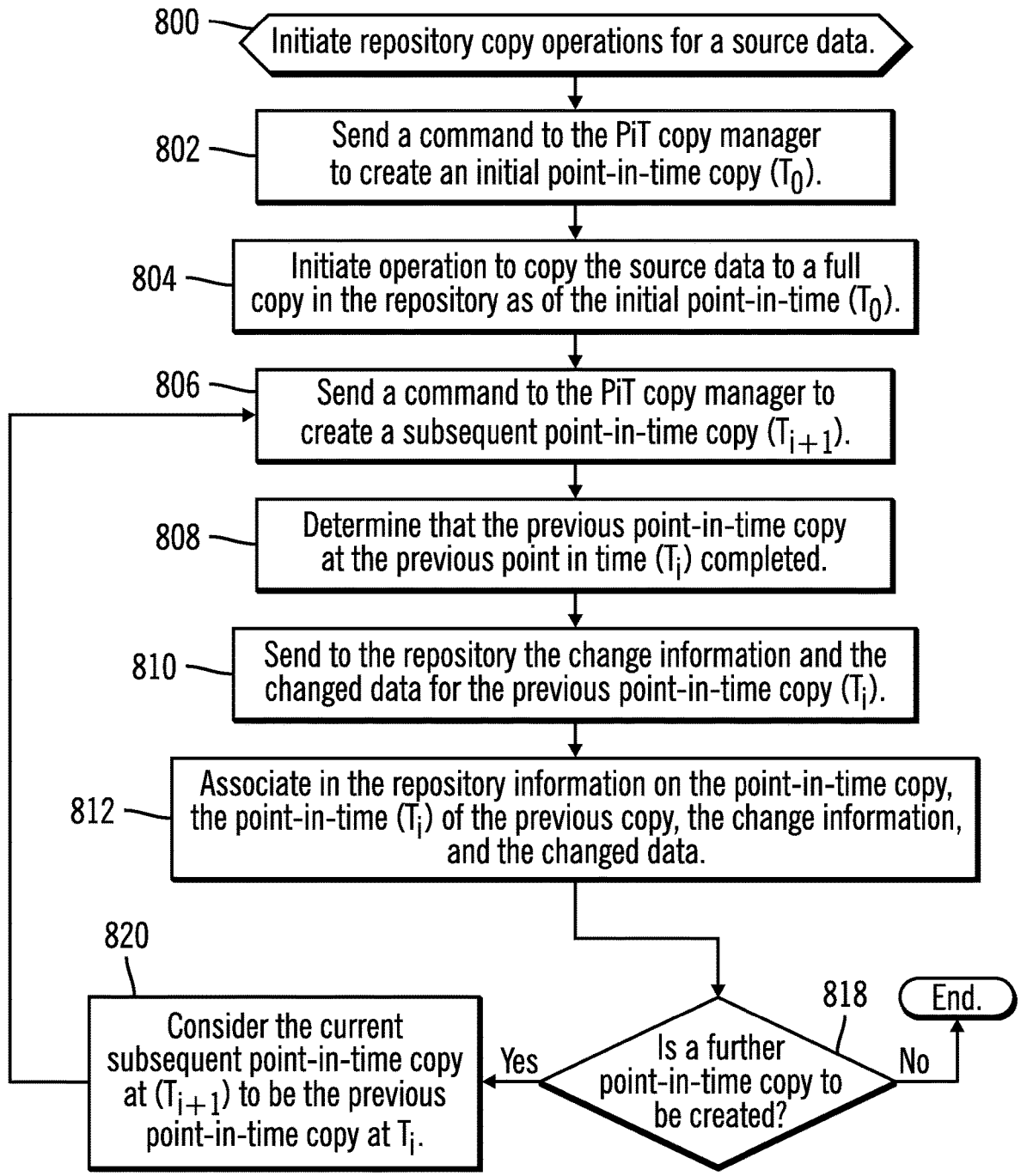
Figure 9:
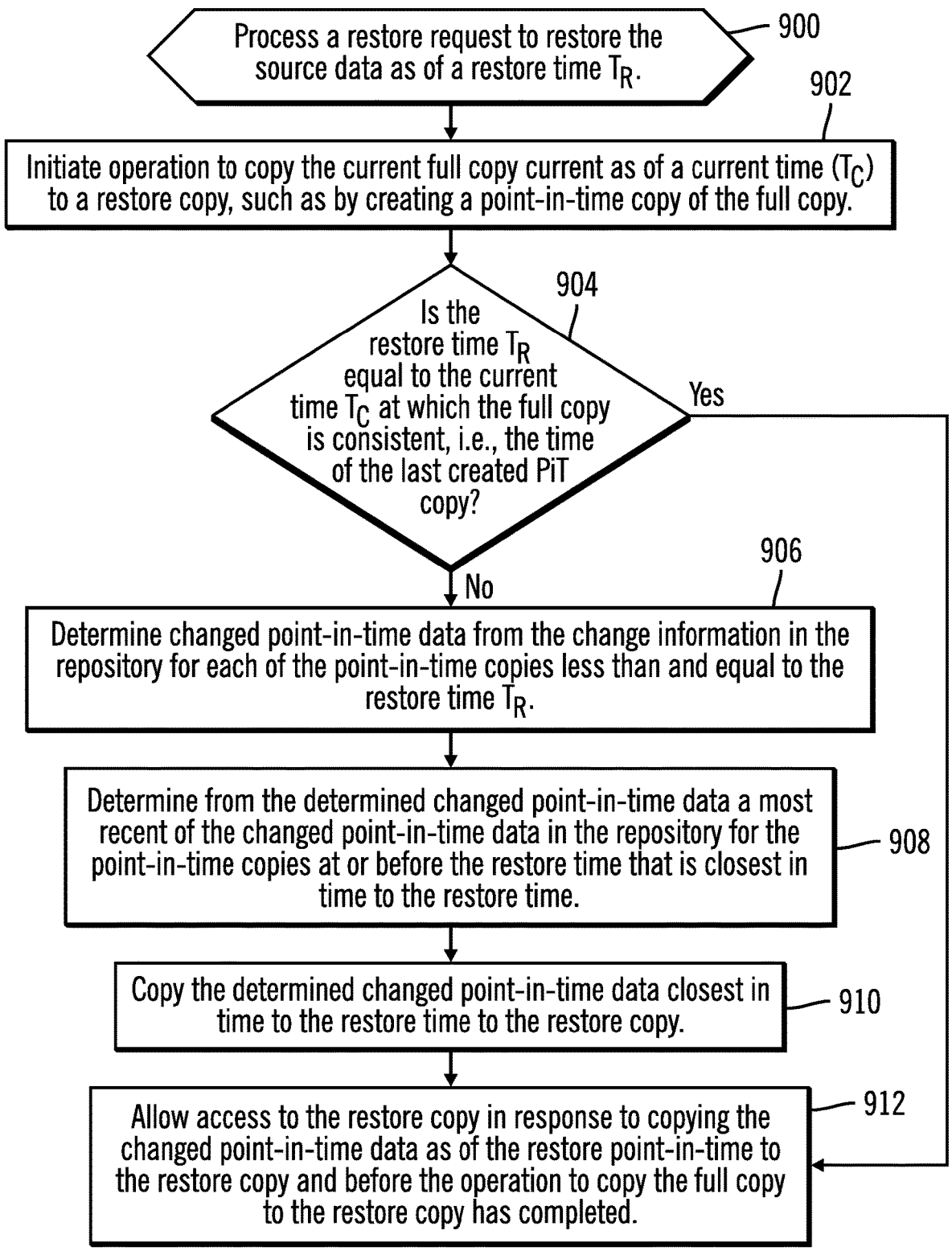

FIGS. 8 and 9 illustrate an alternative embodiment where the changed PiT data 208 is not applied to the full copy 110 as done in block 412 of FIG. 4. Instead, in this alternative embodiment, the full copy 120 remains it its initial state following the first PiT copy at $T_0$. Blocks 800, 802, 804, 806, 808, 810, 812, 818, and 820 of FIG. 8 comprise the operations of blocks 400, 402, 404, 406, 408, 410, 412, 418, and 420 in FIG. 4, except that the full copy remains at its initial state including only data from the first PiT copy $608_0$.

FIG. 9 provides an alternative embodiment to FIG. 5 to restore the data as of a restore time $T_R$ in the alternative embodiment where the full copy 120 is not updated with the changed data but remains in the state as of the first PiT copy at $T_0$. Blocks 900, 902, 904, and 912 comprise the operations of blocks 500, 502, 504, and 512 in FIG. 5, whereas blocks 906, 908, and 910 in FIG. 9 differ from blocks 506, 508, and 510 in FIG. 5 as follows. If (at block 904) the restore time $T_R$ is at a point-in-time greater than the current time $T_0$ of the full copy 120, then control proceeds to block 906 to roll forward the restore copy 124 created from the full copy 120 at the initial time $T_0$ to the later restore time $T_R$. At block 906, the repository copy manager 108 determines changed PiT data 208 from the change information 206 for each of the PiT copies $200_i$ having a point-in-time less than or equal to the restore time $T_R$. A determination is then made (at block 908) from the determined changed point-in-time data of a most recent of the changed point-in-time data in the repository 110, i.e., the changed point-in-time data closest in time to the restore time, for PiT copies 200b prior the restore point-in-time $T_R$. The determined most recent of the changed PiT data is copied (at block 910) to the restore copy 124 to roll the restore copy 124 forward to the time of the restore time $T_R$. The repository copy manager 108 allows (at block 912) access to the restore copy 124 in response to copying the changed point-in-time data as of the restore time ($T_R$) to the restore copy 124 and before the background operation to copy the full copy to the restore copy has completed. If the user attempts to access data in the restore copy 124 not yet copied from the full copy 120, then the requested data may be retrieved from the full copy 120 to copy to the restore copy 124 and returned to the user.

As with the embodiment of FIG. 5, in the embodiment of FIG. 9, the repository copy manager 108 may consolidate the changed data in the PiT copies up to the restore time $T_R$ so that if there are multiple instances of changed data for one data unit at different point-in-times prior to the restore time $T_R$ then only the most recent of the changed data for the data unit from the PiT copies up until the restore time $T_R$ is copied to the restore copy 124. In an alternative embodiment, the repository copy manager 108 may perform a brute force copy method by starting from the earliest PiT copy prior to the restore time $T_R$ and copying the changed data, and then copying the changed data for each subsequently more recent PiT copy until the changed data for the PiT copy having a point-in-time at the restore time $T_R$ is copied to the restore copy 124. Other techniques may be used to roll forward the restore copy 120 to the restore time following the current time.

In a still further embodiment, the full copy 120 may be maintained at a point-in-time between the initial point-in-time $T_0$ and the current point-in-time $T_C$ of the most recent PiT copy. In such case, the restore operation may involve rolling forward or rolling back the full copy 120 from PiT copies before or after the restore time, respectively.

Figure 10:
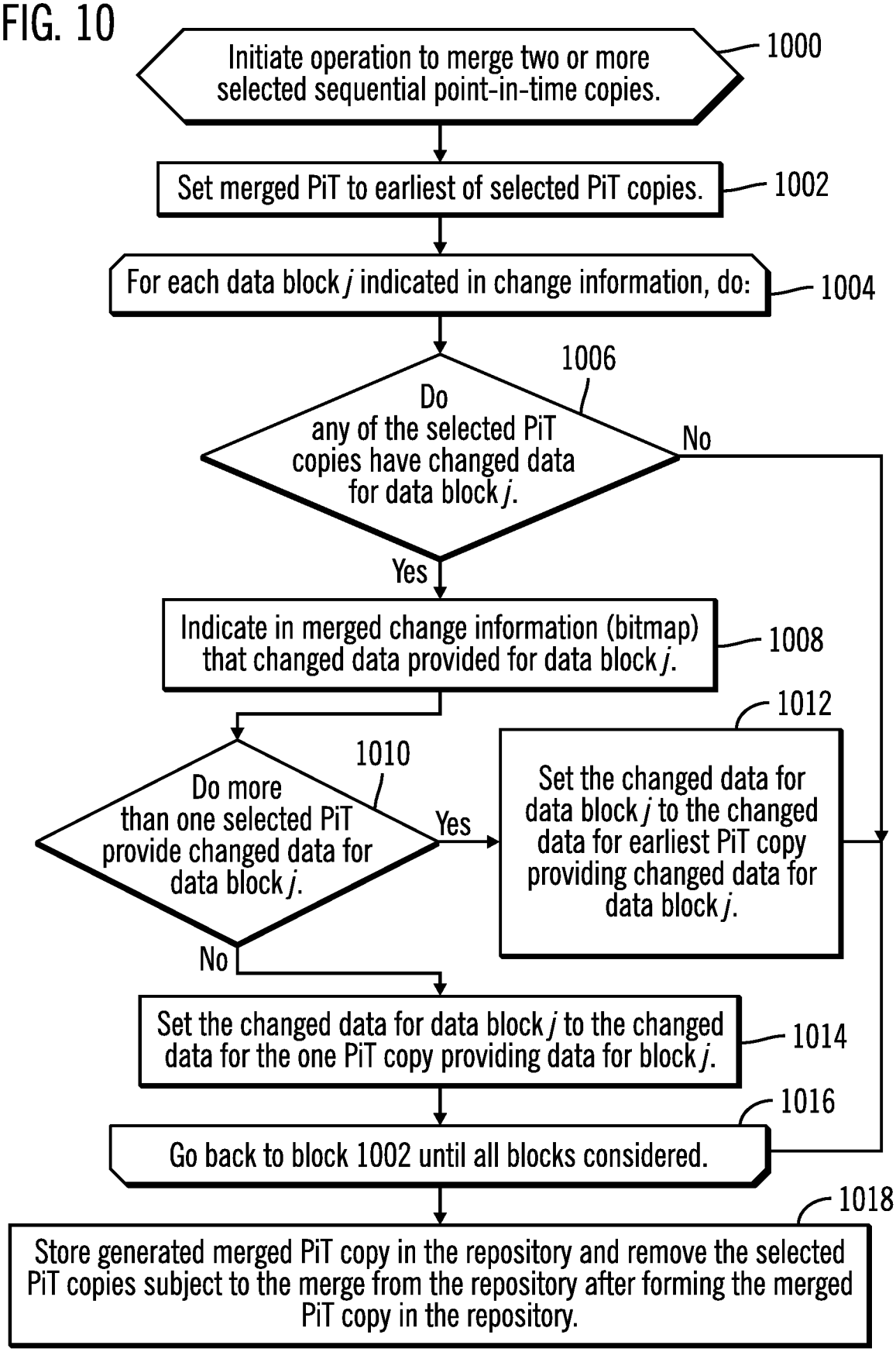
FIG. 10 illustrates an embodiment of operations to merge point-in-time copies in the repository.

FIG. 10 illustrates an embodiment of operations performed by the repository copy manager 108 to merge instances of repository PiT copy information $200_i$, also referred to as PiT copies, to consolidate two or more consecutive PiT copies ($PiT_i \ldots PIT_n$) into a single merged PiT copy. FIG. 10 provides operations performed by the repository copy manager 108 for merging PiT copies in the situation where the full copy 120 is continually provided modified data to be current as of the last PiT copy created, such as described with respect to FIGS. 4 and 5. In this embodiment, at block 414 in FIG. 4, the full copy 120 is updated with the data that has changed since the previous point-in-time to make the full copy current as of a subsequent point-in-time. In such an embodiment, the PiT copies 200b are used to roll back the full copy 120 to a previous point-in-time. Upon receiving (at block 1000) two or more selected PiT copies $200_i \ldots 200_n$ to merge, the repository copy manager 108 sets (at block 1002) the PiT 204 for the merged PiT copy to the earliest PiT 204 of the selected PiT copies $200_i \ldots 200n$.

The repository copy manager 108 performs a loop of operations at blocks 1004 through 1016 for each data block in the change information 206, e.g., bitmap, where the bitmap 206 may be initialized to indicate no changed data for any data block. If (at block 1006) any of the selected consecutive PiT copies to merge has changed data for block j, then the merged change information 206 (bitmap) is set (at block 1008) to indicate that the merged PiT copy provides changed data for data block j. If (at block 1010) more than one selected PiT copy provides changed data for data block j, then the repository copy manager 108 sets (at block 1012) the changed data for data block j to the changed data for earliest PiT copy providing changed data for data block j. If (at block 1010) only one selected PiT copy provides change data for data block j, then the repository copy manager108 sets (at block 1014) the changed data for data block j to the changed data for the one PiT copy providing data for block j. At block 1016, control proceeds back to block 1002 until all blocks indicated in the change information 206 are considered. The generated merged PiT copy is stored (at block 1018) in the repository 110 and the selected PiT copies $200_i \ldots 200n$ subject to the merge may be removed from the repository 110 after forming the merged PiT copy in the repository 110.

In the embodiment of FIG. 10, if multiple of the selected PiT copies to merge provide changed data 208 for a data block (at block 1012), then the data block in the merged changed data 208 is set to the changed data from the earliest PiT copy providing changed data for the data block to allow the full copy 120 to be rolled back to the PiT of the merged selected PiT copies $200_i \ldots 200_n$, which is the earliest point-in-time 204 of the PiT copies $200_i \ldots 200n$ being merged.

In an alternative embodiment where the full copy 120 is not updated, but includes data as of the initial PiT copy ($T_0$), such as described with respect to FIGS. 8 and 9, the operations in FIG. 10 would be modified such that at block 1002, the PiT 204 of the merged PiT copy $200_i$ is set to the most current point-in-time 204 of the selected PiT copies $200_i \ldots 200n$ or $T_n$. Further, the operation at block 1012 would be modified to set the changed data block j to the changed data 208 from the most current merged PiT copy $200_i \ldots 200n$ providing changed data for the data block j to allow the full copy 120 to be rolled forward to the PiT of the merged selected PiT copies i . . . n, which is the most recent point-in-time 204 ($T_n$) of the PiT copies being merged.

The operations of FIG. 10 for both embodiments consolidates PiT copy information 200b in the repository 110 to provide a more efficient storage of PiT copies when certain intermediary PiT copies are no longer needed. Further, the consolidation operation of FIG. 10 conserves space in the repository 110 because if multiple PiT copies provide changed data for the same data blocks, merging these PiT copies reduces the amount of instances of changed data 20 in the repository 110 as well as the data needed to store the change information 206 bitmaps. This frees up space in the repository 110 for newer PiT copies.

Further, the PiT copies may be systematically merged to reduce management overhead by keeping limited PiT copies for a time period. For instance, if there are multiple PiT copies for sub-time periods of a greater time period, e.g., hourly PiT copies for a day, daily PiT copies for a week, weekly PiT copies for a month, etc., then multiple of the sub-time period PiT copies can be merged into one sub-time period PiT copy for the overall time period, e.g., only keep one hour PiT copy for a first day, one day for a first week, and so on.

The described embodiments provide techniques to merge PiT copies in a repository generated by a storage controller 100 that includes a full copy 120 of the source data current and has PiT copy information for PiT copies created by the storage controller 100 at different point-in-times that may be used to restore the source data 104 to a restore copy having the data as of the different point-in-times of the PiT copies maintained at the repository. In a first embodiment, the full copy may be continually updated with changed data maintained with the PiT copies to keep the PiT copy current as of the most recent PiT copy point-in-time. In this first embodiment, the merge operation uses as the merge point-in-time the earliest of the PiT copies being merged. In such case, if multiple of the PiT copies being merged provides changed data for one data block, then the changed data from the PiT copy that has the earliest point-in-time is used in the merged changed data to allow restoration to the point-in-time of the merged PiT copy, which is the earliest point-in-time of the PiT copies being merged.

In a second embodiment, the full copy may not be updated and instead maintained at the initial time $T_0$ of the first PiT copy. In this second embodiment, the merge operation uses as the merge point-in-time the most recent of the PiT copies being merged. In such case, if multiple of the PiT copies being merged provides changed data for one data block, then the changed data from the PiT copy having the most recent point-in-time is used in the merged changed data to allow restoration to the point-in-time of the merged PiT copy, which is the most recent point-in-time of the PiT copies being merged.

The reference characters used herein, such as i, j, k, l, m, n, are used herein to denote a variable number of instances of an element, which may represent the same or different values, and may represent the same or different value when used with different or the same elements in different described instances.

In certain embodiments, the repository creation and restore operations may be performed by a program component, such as the repository copy manager 108, that is separate from the storage controller logic, e.g., the PiT copy manager 116 that created the PiT copies.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
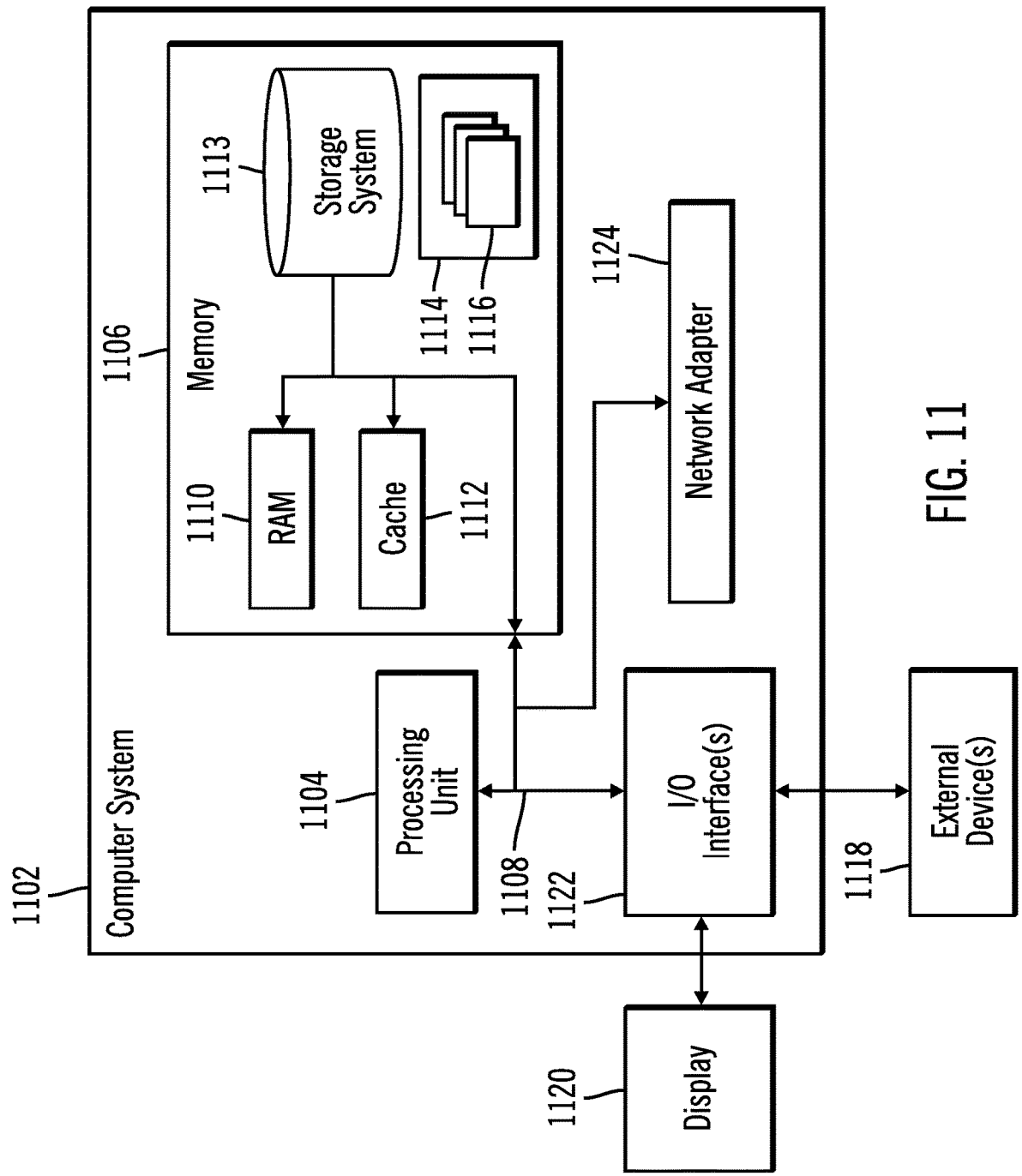
FIG. 11 illustrates a computing environment in which the components of FIG. 1 may be implemented.

The computational components of FIG. 1, including the storage controller 100 and host 106 may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for maintaining source data in a repository, the computer program product comprising a computer readable storage medium including computer program instructions to cause a processor to perform operations, the operations comprising:

maintaining in the repository a full copy of the source data and point-in-time copies at different point-in-times of the source data;

indicating, in merged change information for a merged point-in-time copy, data blocks in the source data that have changed data from point-in-time copies;

for each data block of the data blocks indicated in the merged change information as having changed data, performing:

determining whether only one point-in-time copy or a plurality of point-in-time copies provide changed data for the data blocks;

in response to determining the plurality of point-in-time copies provide the changed data for the data block, setting the changed data in the merged point-in-time copy for the data block to changed data for the data block in a determined one point-in-time copy of the determined plurality of point-in-time copies for the data block; and in response to determining only one point-in-time copy provides the changed data for the data block, setting the changed data in the merged point-in-time copy for the data block to the changed data in the only one point-in-time copy providing the changed data for the data block;

setting a merged point-in-time for the merged point-in-time copy to a point-in-time of the only one point-in-time copy in response to determining that that only one point-in-time copy provides changed data for the data blocks;

setting a merged point-in-time for the merged point-in-time copy to a point-in-time of the determined one point-in-time copy of the plurality of point-in-time copies in response to determining that the plurality of point-in-time copies provides changed data for the data blocks; and using the merged point-in-time copy to restore the source data to the merged point-in-time.

2. The computer program product of claim 1, wherein the merged point-in-time is set to an earliest point-in-time of point-in-times of the determined plurality of point-in-time copies in response to determining that the plurality of point-in-time copies provides changed data for the data blocks.

3. The computer program product of claim 1, wherein the determined one point-in-time copy of the determined plurality of point-in-time copies comprises a point-in-time copy that has an earliest point-in-time of the determined plurality of point-in-time copies.

4. The computer program product of claim 1, wherein the operations further comprise:

applying, to the full copy, source data that has changed since a previous point-in-time to make the full copy current as of a subsequent point-in-time to the previous point-in-time, wherein the using the merged point-in-time copy to restore the source data further comprises applying the changed data in the merged point-in-time copy to a restore copy to make the restore copy consistent as of a merged point-in-time to roll back the full copy to the changed data provided for the merged point-in-time copy.

5. The computer program product of claim 1, wherein the full copy includes data as of an initial point-in-time, wherein the merged point-in-time for the merged point-in-time copy is set to a point-in-time of one of the plurality of point-in-time copies having a most current point-in-time.

6. A system for maintaining source data in a repository, comprising: a processor; and a computer readable storage medium including computer program code that when executed by the processor performs operations, the operations comprising:

maintaining in the repository a full copy of the source data and point-in-time copies at different point-in-times of the source data;

indicating, in merged change information for a merged point-in-time copy, data blocks in the source data that have changed data from point-in-time copies;

for each data block of the data blocks indicated in the merged change information as having changed data, performing:

determining whether only one point-in-time copy or a plurality of point-in-time copies provide changed data for the data blocks;

in response to determining the plurality of point-in-time copies provide changed data for the data block, setting the changed data in the merged point-in-time copy for the data block to changed data for the data block in a determined one point-in-time copy of the determined plurality of point-in-time copies for the data block; and in response to determining only one point-in-time copy provides the changed data for the data block, setting the changed data in the merged point-in-time copy for the data block to the changed data in the only one point-in-time copy providing the changed data for the data block;

setting a merged point-in-time for the merged point-in-time copy to a point-in-time of the only one point-in-time copy in response to determining that that only one point-in-time copy provides changed data for the data blocks;

setting a merged point-in-time for the merged point-in-time copy to a point-in-time of the determined one point-in-time copy of the plurality of point-in-time copies in response to determining that the plurality of point-in-time copies provides changed data for the data blocks; and using the merged point-in-time copy to restore the source data to the merged point-in-time.

7. The system of claim 6, wherein the merged point-in-time is set to an earliest point-in-time of point-in-times of the determined plurality of point-in-time copies in response to determining that the plurality of point-in-time copies provides changed data for the data blocks.

8. The system of claim 6, wherein the determined one point-in-time copy of the determined plurality of point-in-time copies comprises a point-in-time copy of the determined plurality of point-in-time copies that has an earliest point-in-time of the determined plurality of point-in-time copies.

9. The system of claim 6, wherein the operations further comprise:

applying, to the full copy, source data that has changed since a previous point-in-time to make the full copy current as of a subsequent point-in-time to the previous point-in-time, wherein the using the merged point-in-time copy to restore the source data further comprises applying the changed data in the merged point-in-time copy to a restore copy to make the restore copy consistent as of a merged point-in-time to roll back the full copy to the changed data provided for the merged point-in-time copy.

10. The system of claim 6, wherein the full copy includes data as of an initial point-in-time, wherein the merged point-in-time for the merged point-in-time copy is set to a point-in-time of one of the plurality of point-in-time copies having a most current point-in-time.

11. A method for maintaining source data in a repository, comprising:

maintaining in the repository a full copy of the source data and point-in-time copies at different point-in-times of the source data;

indicating, in merged change information for a merged point-in-time copy, data blocks in the source data that have changed data from point-in-time copies;

for each data block of the data blocks indicated in the merged change information as having changed data, performing:

determining whether only one point-in-time copy or a plurality of point-in-time copies provide changed data for the data blocks;

in response to determining the plurality of point-in-time copies provide the changed data for the data block, setting the changed data in the merged point-in-time copy for the data block to changed data for the data block in a determined one point-in-time copy of the determined plurality of point-in-time copies for the data block; and in response to determining only one point-in-time copy provides the changed data for the data block, setting the changed data in the merged point-in-time copy for the data block to the changed data for the determined only one point-in-time copy providing the changed data for the data block;

setting a merged point-in-time for the merged point-in-time copy to a point-in-time of the only one point-in-time copy in response to determining that that only one point-in-time copy provides changed data for the data blocks;

setting a merged point-in-time for the merged point-in-time copy to a point-in-time of the determined one point-in-time copy of the plurality of point-in-time copies in response to determining that the plurality of point-in-time copies provides changed data for the data blocks; and using the merged point-in-time copy to restore the source data to the merged point-in-time.

12. The method of claim 11, wherein the merged point-in-time is set to an earliest point-in-time of point-in-times of the determined plurality of point-in-time copies in response to determining that the plurality of point-in-time copies provides changed data for the data blocks.

13. The method of claim 11, wherein the determined one point-in-time copy of the determined plurality of point-in-time copies comprises a point-in-time copy that has an earliest point-in-time of the determined plurality of point-in-time copies.

14. The method of claim 11, further comprising:

applying, to the full copy, source data that has changed since a previous point-in-time to make the full copy current as of a subsequent point-in-time to the previous point-in-time, wherein the using the merged point-in-time copy to restore the source data further comprises applying the changed data in the merged point-in-time copy to a restore copy to make the restore copy consistent as of a merged point-in-time to roll back the full copy to the changed data provided for the merged point-in-time copy.

15. The method of claim 11, wherein the full copy includes data as of an initial point-in-time wherein the merged point-in-time for the merged point-in-time copy is set to a point-in-time of one of the plurality of point-in-time copies having a most current point-in-time.

* * * * *